(12) United States Patent
Rushby et al.

(10) Patent No.: US 7,865,339 B2
(45) Date of Patent: Jan. 4, 2011

(54) FORMAL METHODS FOR TEST CASE GENERATION

(75) Inventors: John Rushby, Redwood City, CA (US); Leonardo Mendonga De Moura, Fremont, CA (US); Gregoire Hamon, Saint Leu la Foret (FR)

(73) Assignee: SRI International, Menlo Park, CA (US)

( * ) Notice: Subject to any disclaimer, the term of this patent is extended or adjusted under 35 U.S.C. 154(b) by 794 days.

(21) Appl. No.: 10/889,266

(22) Filed: Jul. 12, 2004

(65) Prior Publication Data

US 2006/0010428 A1    Jan. 12, 2006

(51) Int. Cl.
G06F 17/10    (2006.01)
(52) U.S. Cl. ......................................... 703/2
(58) Field of Classification Search ............... 703/2, 703/13
See application file for complete search history.

(56) References Cited

U.S. PATENT DOCUMENTS 6,026,222 A * 2/2000 Gupta et al. .................. 716/5
7,073,143 B1 * 7/2006 Huang ............................ 716/5

OTHER PUBLICATIONS

Eén et al., "Temporal Induction by Incremental SAT Solving," Electronic Notes in Theoretical Computer Science 2003.*
Hlavaty et al., "Formal Methods in Development and Testing of Safety-Critical Systems: Railway Interlocking System," Proceedings of Workshop 2002.*
Groce, "Error Explanation with Discrete Metrics," Springer-Verlag Berlin Heidelberg 2004.*
Clarke et al., "Bounded Model Checking Using Satisfiability Solving," Advances in Computers, vol. 58, 2003.*
G. Hamon et al., An Operational Semantics for Stateflow, Fundamental Approaches to Software Engineering, Mar. 2004, pp. 229-243, LNCS 2984, Springer-Verlag.
Hong et al., Data Flow Testing as Model Checking, 25th Intl. Conf. on Software Engineering, May 2004, pp. 232-242, IEEE Computer Society.
P.E. Black et al., Winnowing tests: Getting Quality Coverage from a Model Checker without Quantity, 20th AIAA/IEEE Digital Avionics Conf., Oct. 2001, pp. 9B6/1-9B6/4, IEEE.
K. Hayhurst et al., A Practical Tutorial on Modified Condition/Decision Coverage, NASA Technical Memo. TM-2001-210876, May 2001, NASA Langley Research Center.

* cited by examiner

Primary Examiner—Hugh Jones

(57) ABSTRACT

The invention relates to the use of model checkers to generate efficient test sets for hardware and software systems. The method provides for extending existing tests to reach new coverage targets; searching *to* some or all of the uncovered targets in parallel; searching in parallel *from* some or all of the states reached in previous tests; and slicing the model relative to the current set of coverage targets. The invention provides efficient test case generation and test set formation. Deep regions of the state space can be reached within allotted time and memory. The approach has been applied to use of the model checkers of SRI's SAL system and to model-based designs developed in Stateflow. Stateflow models achieving complete state and transition coverage in a single test case are reported.

38 Claims, 9 Drawing Sheets

Restarting from previously discovered states rather than initial states

```
goals := the set of coverage goals
knownstates := initial states
failures := empty set
while goals is nonempty do
  Call model checker to extend a test
    case from some state in knownstates
    to discharge some goal
  if successful then
    Remove from goals any that
      are discharged by the test case
    add to knownstates those states
      traversed by the current test case
    slice system relative to goals
    while goals is nonempty do
      Call model checker to extend
        test case to discharge some goal
      if successful then
        remove from goals any
          discharged by extended test case
        add to knownstates those states
          traversed by current test case
        slice system relative to goals
      endif
    endwhile
    Output test case
  else
    failures := goals;
    goals := empty set
  endif
endwhile
```

Constructing test cases by incremental extension

*goals* := the set of coverage goals
*failures* := empty set
while *goals* is nonempty do
    Select and remove *goal* from *goals*
    Call model checker to generate
      a new test case to discharge *goal*
    if successful then
        Select and remove from *goals* any that
            are discharged by the test case
        *remaining* := empty set
        while *goals* is nonempty do
            Remove *goal* from *goals*
            Call model checker to extend
                test case to discharge *goal*
            if successful then
                remove from *goals* and from
                    *remaining* any goals
                    discharged by extended test case
            else add *goal* to *remaining*
            endif
        endwhile
        *goals* := *remaining*
        Output test case
    else add *goal* to *failures* endif
endwhile

Fig 5

Searching for test cases in parallel, and slicing the model as goals are discharged

```
goals := the set of coverage goals
failures := empty set
while goals is nonempty do
Call model checker to generate
    a new test case to discharge some goal
if successful then
    Remove from goals any that
        are discharged by the test case
    slice system relative to goals
    while goals is nonempty do
        Call model checker to extend
            test case to discharge some
        goal
        if successful then
            remove from goals any
                discharged by extended test
        case
            slice system relative to goals
        endif
    endwhile
    Output test case
else
    failures := goals;
    goals := empty set
endif
endwhile
```

Fig 6

Restarting from previously discovered states rather than initial states

*goals* := the set of coverage goals
*knownstates* := initial states
*failures* := empty set
while *goals* is nonempty do
   Call model checker to extend a test
     case from some state in *knownstates*
     to discharge some goal
if successful then
    Remove from *goals* any that
       are discharged by the test case
    add to *knownstates* those states
      traversed by the current test case
    slice system relative to *goals*
    while *goals* is nonempty do
       Call model checker to extend
          test case to discharge some goal
      if successful then
          remove from *goals* any
             discharged by extended test case
          add to *knownstates* those states
             traversed by current test case
          slice system relative to *goals*
      endif
    endwhile
    Output test case
else
    *failures* := *goals*;
    *goals* := empty set
endif
endwhile

Fig 7 knownstates seeded by random testing or other methods

FORMAL METHODS FOR TEST CASE GENERATION

GOVERNMENT FUNDING

This application was made in part with government support under contract number NAS1-00079 awarded by NASA Langley Research Center; this application was also made in part with government support under contract number CCR-00-86096 awarded by the National Science Foundation. The Government has certain rights in this invention.

RELATED APPLICATIONS

Not applicable.

BACKGROUND

Testing is the dominant method for finding bugs in computer software and hardware. When combined with methods to measure the amount of coverage achieved, it is also the dominant method for assessing when the software or hardware concerned is good enough for release. Testing to high coverage is enormously expensive. For example, more than half the development costs in avionics systems are spent on verification and validation activities, and testing is a substantial part of verification and validation. In hardware and software companies, more than half the entire technical staff may be devoted to testing.

Performing tests and evaluating test outcomes can be automated to a considerable degree, but generating test cases still is a largely a time consuming manual process. The quality and coverage of the tests generated is utterly dependent on the skill and diligence of those performing the task. Coverage is a measure of how thoroughly a system has been tested. Coverage can be defined with respect to the structure of the system under test (SUT) (e.g., requiring that every control point or every branch in the software is visited by at least one test), with respect to the structure of the model or design from which the SUT was developed, or with respect to the properties that the SUT is expected to satisfy (e.g., those properties documented in its requirements specification).

Current attempts to develop automatic test case generation involve describing the target of each test by means of a property (e.g., "reach control point X in the SUT"), then solving the constraint satisfaction problem to find inputs to the SUT that will drive it through an execution that satisfies the property concerned. A popular way to solve the constraint satisfaction problem is by means of a model checker: the model checker is asked to check the negation of the property concerned (e.g., "the SUT never reaches control point X") in some representation of the SUT or its design or specification, and will produce a counterexample (e.g., a trace of state transitions in SUT that reaches control point X from some initial state) that is equivalent to the desired test case. Guided by the coverage desired, different test targets are identified and separate tests are generated for each one. FIG. 1 illustrates a generally understood representation of test generation for a SUT. Because each test is generated separately, each of them restarts the SUT (which can make the test expensive to perform), and the set of tests generated by this approach contains much redundancy (e.g., many tests start the same way). This is inefficient, both in generating tests, and in executing them. Furthermore, the model checker or other method may be unable to solve the constraint satisfaction problems for targets whose tests require many steps from an initial state.

A variant on this approach to automatic test case generation overcomes some of the limitations of model checking and constraint satisfaction, but stops short of addressing the need to generate irredundant test sets. (See Beyer et al., Generating Tests from Counterexamples. In 26th International Conference on Software Engineering, Edinburgh, Scotland, May 2004; IEEE Computer Society).

Yet another approach advocates building an abstract model and doing a so-called "Chinese postman's tour" thereby generating a big, sweeping test case and an efficient test set. (See Grieskamp et al., Generating finite state machines from abstract state machines. In International Symposium on Software Testing and Analysis (ISSTA), pages 112-122, Association for Computing Machinery, Rome, Italy, July 2002). Restricted to explicit-state model checking, these tour-based approaches are unsuited to achieving coverage goals (e.g., MC/DC; See K. Hayhurst, D. Veerhusen, J. Chilenski, and L. Rierson. A Practical Tutorial on Modified Condition/Decision Coverage. NASA Technical Memorandum TM-2001-210876, NASA Langley Research Center, Hampton, Va., May 2001.) of the kind used in avionics and other critical embedded systems and are suitable only for validation of consumer products.

What is needed is an efficient method for the automated generation of test cases that achieves high coverage with a minimal number of tests. What is also needed is a method for automated test generation providing rapid generation of tests and providing a high level of coverage within the time and memory budget available.

BRIEF SUMMARY

The invention provides a means for generating test cases that provides precisely targeted coverage of a SUT. Provided is a method and system for automated generation of test cases, enabling rapid test case generation. As a consequence of the rapid test case generation, the inventive approach provides significant reduction in the development cost of a system. The inventive method provides a means for extending existing tests to reach new coverage targets. The method also provides a means for parallel searching to all undiscovered target goals. Further, the method provides a means for parallel searching from any number of states reached in previous tests.

It is an aspect of the invention that, rather than returning to the initial state and revisiting all intermediate states already visited, the new test case is extended from the last visited state. The model is modified internally in two ways: it is sliced, and it is changed (or the specification of the property defining the next test case to be generated is changed) so that the next test case extends the previous one if possible (as opposed to being generated from a start state). Slicing is performed each time the set of outstanding coverage goals is reduced.

The inventive method for generating tests for a system under test (SUT), (where the tests satisfy a coverage metric), includes generating a model of the SUT; generating a first test case with respect to the model; adding the first test case to a collection of test cases; and checking the coverage metric over the collection. If the coverage metric is satisfied, no more test cases are needed and the collection is complete. If the coverage metric is not satisfied, then the model is reduced and a second test case generated with respect to the reduced model.

The inventive test case generation system provides rapid satisfaction of the coverage metric. Moreover, it provides a test case collection from which redundancies have been removed. In one embodiment, the method provides automated analysis and verification of Stateflow programs. The application uses an operational semantics for Stateflow, a decision procedure for embedded deduction, and a suite of model checking tools. The embodiment provides static analysis, debugging and exploration through model checking, and structural unit test case generation for Stateflow.

The inventive method is employable using any tool that solves constraints, and model checkers are discussed by way of example only, and not to be construed as a limitation. Other model based design systems may be used for the inventive method and system for automated test generation.

BRIEF DESCRIPTION OF THE DRAWINGS

FIG. 5 illustrates an example of pseudo code representing constructing test cases by incremental extension.

FIG. 6 illustrates an example of pseudo code representing test case generation searching for test cases in parallel and slicing the model as goals are discovered.

FIG. 7 illustrates an example of pseudo code representing test case generation restarting from previously discovered states rather than initial states.

DETAILED DESCRIPTION OF THE INVENTION

Figure 1:
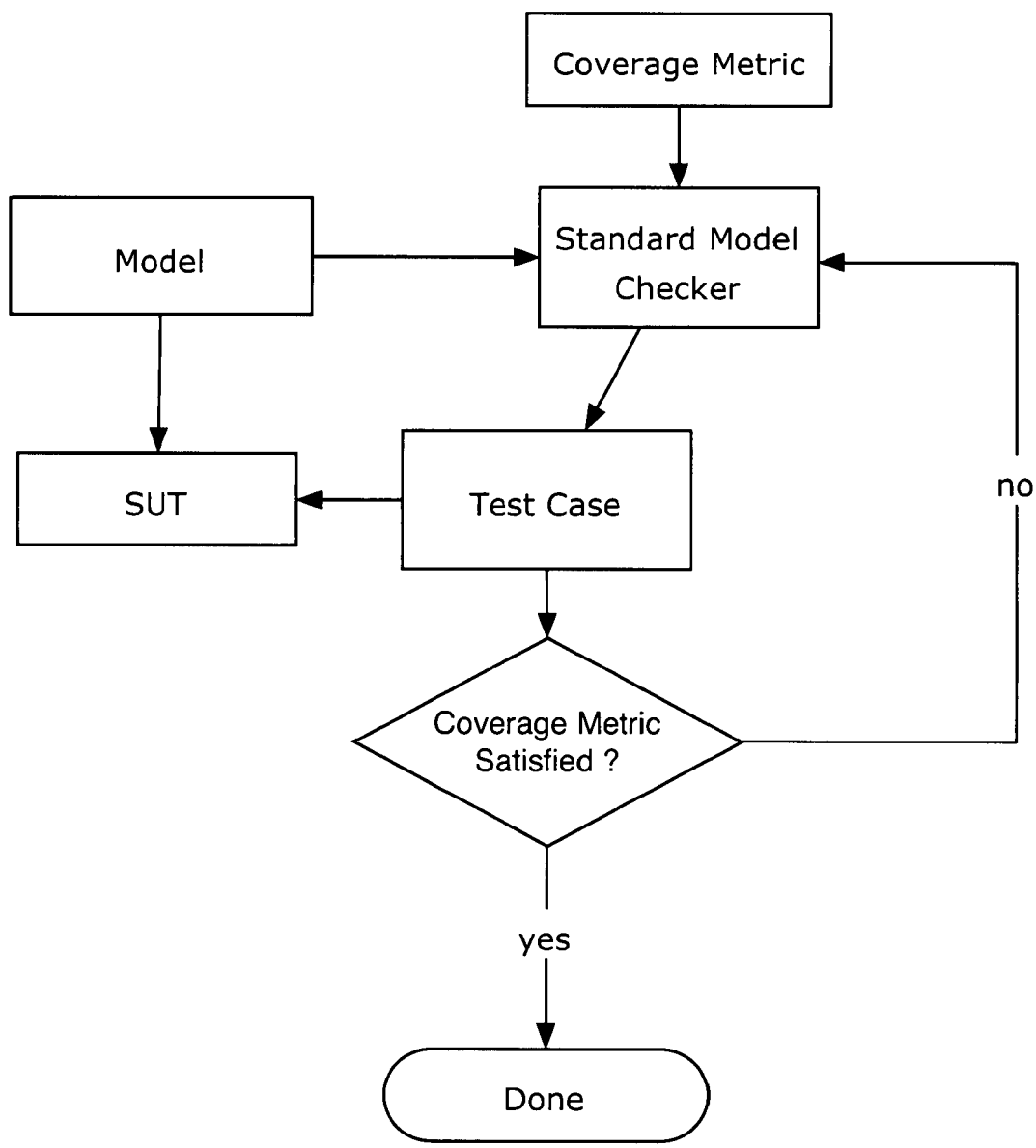
FIG. 1 depicts a known approach to test case generation.
Figure 2:
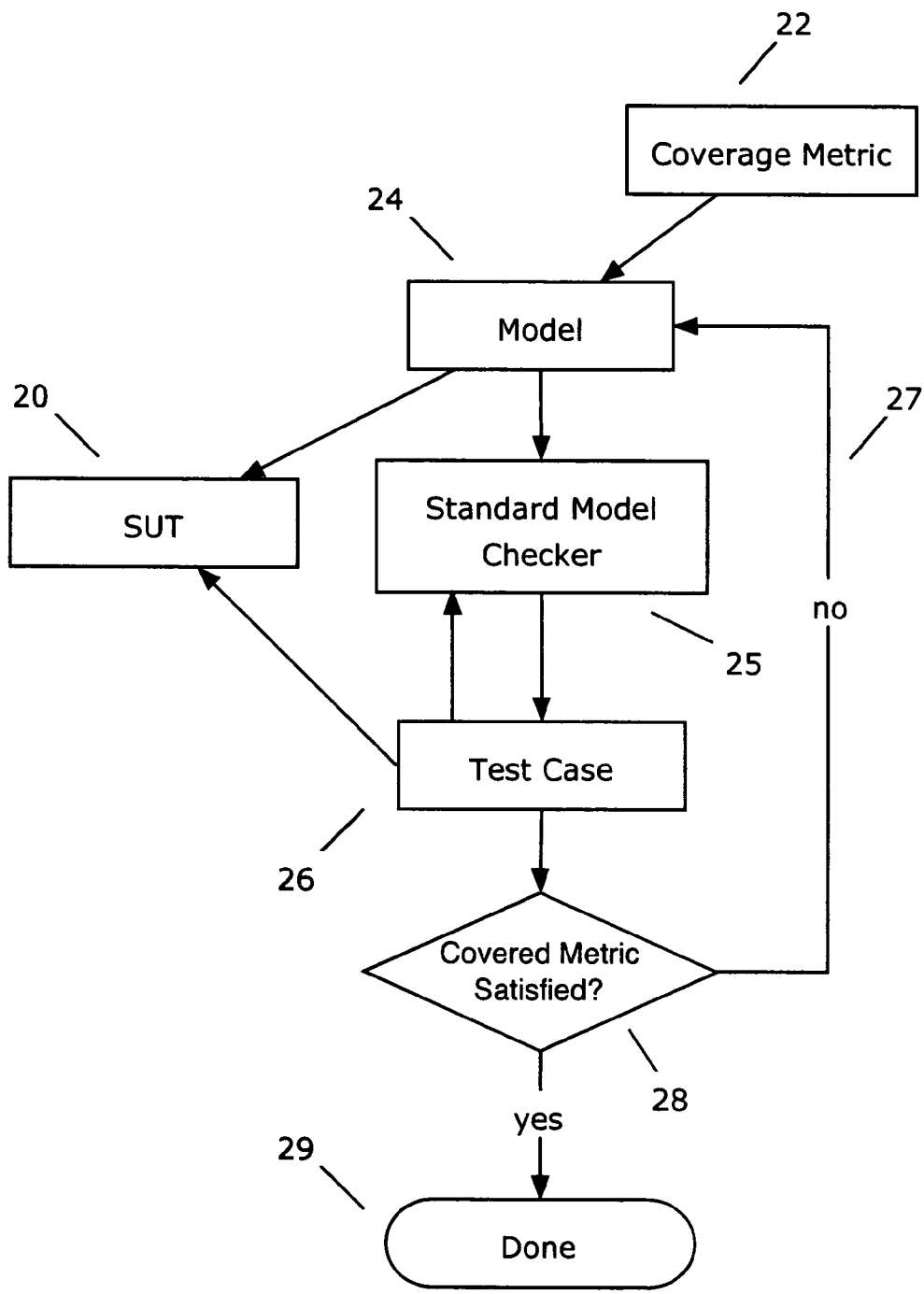
FIG. 2 depicts an inventive approach to test case generation.

Referring to FIG. 2, the inventive approach provides a method for generating tests for a system under test (SUT) 20 that satisfy a coverage metric 22 by generating a model 24 of the SUT; generating a first test case 26 with respect to the model; adding the first test case to a collection of test cases; checking the coverage metric 28 over the collection and if the coverage metric is not satisfied 27; reducing the model; and generating a second test case with respect to the reduced model. Rather than returning to the initial state and revisiting all intermediate states already visited, the new test case is extended from the last visited state.

The path 27 in FIG. 2 represents modification of the model in two distinct ways: slicing and extension. As regards any given set of test targets, slicing eliminates those parts of the model that cannot contribute to the satisfaction of the coverage goals. Slicing is performed internally each time the set of outstanding goals is reduced. As tests are generated, the remaining targets get fewer and fewer, and the parts of the system that are relevant are likewise reduced. Thus, as test generation proceeds, the parts of the system needed to be considered become smaller and smaller.

"Extension" involves modifying the model (or the specification of the property defining the next test case to be generated) so that the next test case extends the previous one if possible (as opposed to being generated from an initial or start state). In conjunction with reduction of the model, the model checker is preferentially internally modified: the construction of test cases by extension is done internally without having to change the model or properties. The advantages of extending test cases rather than returning to the initial state and starting from scratch each time include: a) better test sets and b) deeper statespace penetration. The test sets are better because they are fewer in number, are longer tests, and are less redundant. The deeper penetration of statespace is facilitated by extension of previous test lengths to enable effective test lengths longer than the constraint solver/model checker could handle otherwise. For example, the constraint solver/model checker may be unable to reach coverage targets that require tests of length from the start state because it cannot solve a problem of size 20. However, it may be able to solve a problem of size 20 by extending a previous test of length 15, as it now has only to solve a problem of size 5. The previous test itself was an extension of some length (e.g., 10), and so on, enabling the constraint solver/model checker to reach, by means of extension, coverage targets that would otherwise be beyond its capability.

In the preferred embodiment, the abovementioned slicing and extension are internalized. That is to say, the model checker is modified so that the construction of test sets by extension is done internally, without needing to change the model or properties. The inventive method is employable using any tool that solves constraints, and model checkers are discussed by way of example only, and not to be construed as a limitation.

Figure 3:
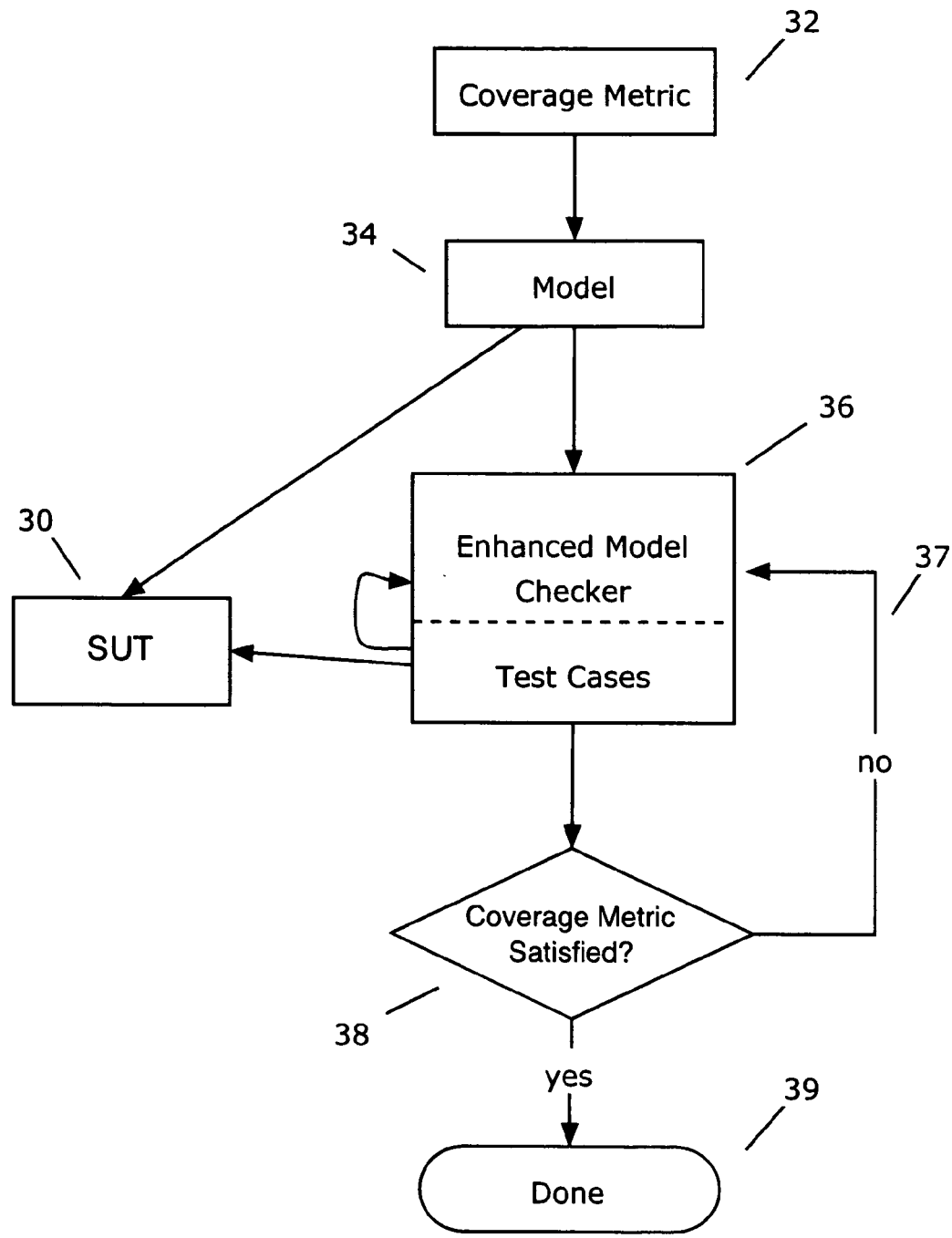
FIG. 3 illustrates an alternate embodiment of the inventive approach.

Referring to the depiction in FIG. 3, it can be seen that the method in the preferred embodiment provides a means for parallel searching to all undiscovered target goals as well as a means for parallel searching from any number of states reached in previous tests.

The method presented is effective for many kinds of system specifications, and for many notions of coverage, although the description is generally focused on examples from model-based development of embedded systems. As represented in FIG. 2 and FIG. 3, executable models 24, 34 are constructed for the system under test (SUT) 20, 30 and its environment and these are used to develop and validate the system design. The model is usually represented in a graphical form, using statecharts, flowcharts, message sequence charts, use diagrams, and so on. One tool for creating such models is Stateflow.

Figure 4:
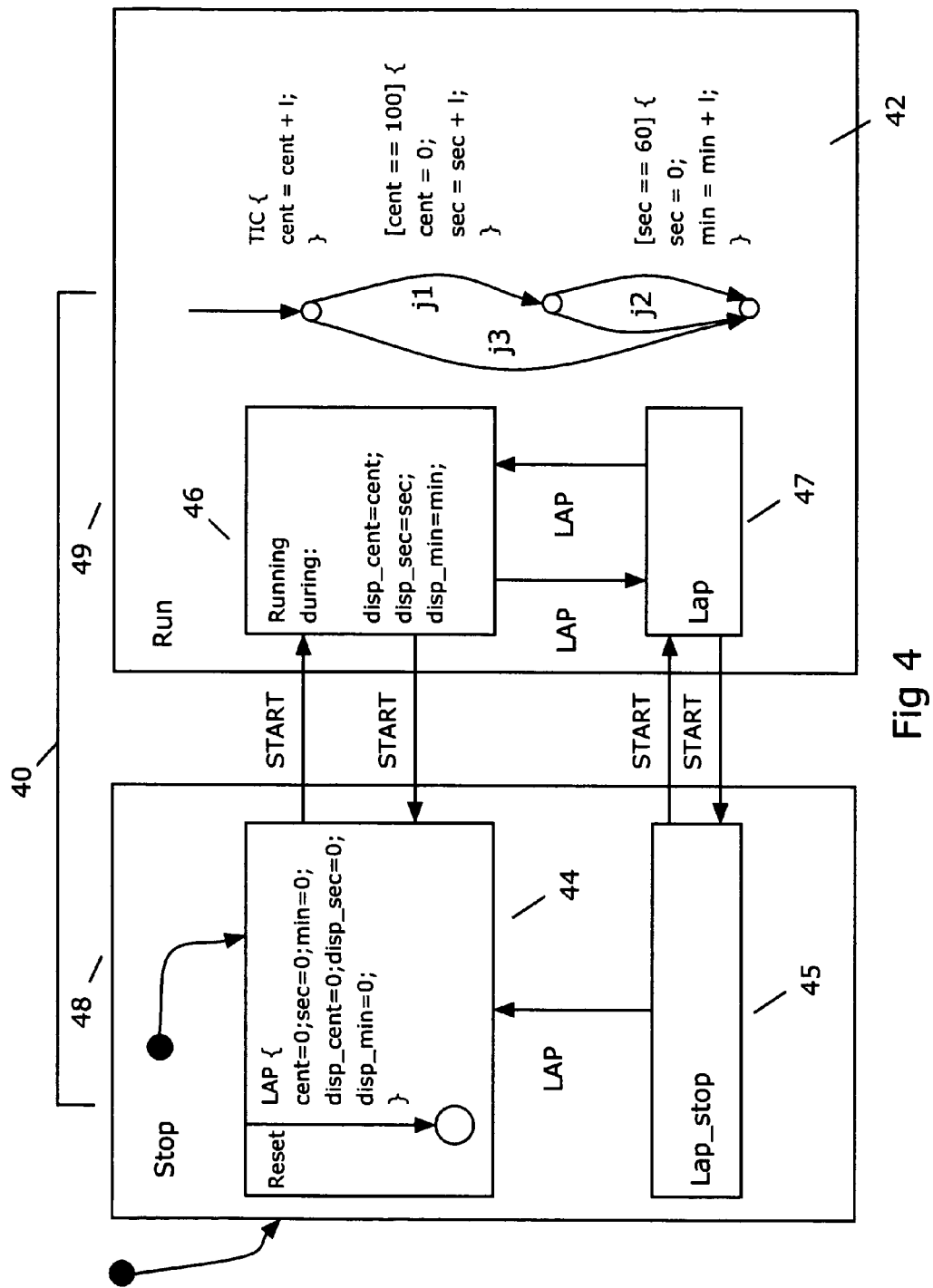
FIG. 4 illustrates a model of a simple stopwatch in Stateflow.

The novel "extension" aspect of the inventive method is depicted in FIG. 5 in regards to a stop watch modeled in Stateflow FIG. 4. Current approaches to test generation produce a separate test case for each coverage goal and, consequently, produce highly redundant test sets. Extension as provided by the invention virtually eliminates redundancy.

FIG. 4 is a graphic representation of the Stateflow specification for a stopwatch with lap time measurement 40. The stopwatch contains a counter or time counter represented by three variables (min, sec, cent) and a display, also represented as three variables (disp_min, disp_sec, disp_cent).

The stopwatch is controlled by two command buttons, START and LAP. The START button switches the time counter 42 on and off; the LAP button fixes the display to show the lap time when the counter is running and resets the counter when the counter is stopped. This behavior is modeled as a statechart with four exclusive states:

Reset 44: the counter is stopped. Receiving LAP resets the counter and the display, receiving START changes the control to the Running mode.

Lap_stop 45: the counter is stopped. Receiving LAP changes to the Reset mode and receiving START changes to the Lap mode.

Running 46: the counter is running, and the display updated. Receiving START changes to the Stop mode, pressing LAP changes to the Lap mode.

Lap 47: the counter is running, but the display is not updated, thus showing the last value it received. Receiving START changes to Lap_Stop, receiving LAP changes to Running.

These four states are here grouped by pairs inside two main states: Run 49 and Stop 48, active respectively when the counter is counting or stopped. The counter itself is specified within the Run state as a flowchart 42, incrementing its cent value every time a clock TIC is received (i.e., every $\frac{1}{100}$ s); the sec value is incremented (and cent reset to 0) whenever cent equals 100, and the min value is similarly incremented whenever sec equals 60. Notice that it requires a test case of length 6,000 to exercise the lower right transition in the flowchart 42: this is where the min variable first takes a nonzero value, following 60 sees, each of 100 cents. Embedded systems often contain counters that must be exhausted before parts of the statespace become reachable so this is an example of the kind of "deep" test goal that is often hard to discharge using model checking.

Focusing now on the statechart labeled Stop 48, if a test case is generated that begins in the initial state and exercises the transition from Lap_stop 45 to Reset 44 (e.g., the sequence of events START, LAP, START, LAP), then this test also exercises the transitions from Reset to Running, Running to Lap, and Lap to Lap_stop. However, the usual approach to generating a test set to achieve transition coverage will independently generate test cases to exercise each of these transitions, resulting in a test set with much redundancy. Black and Ranville describe a method for "winnowing" test sets after generation to reduce their redundancy. (See P. E. Black and S. Ranville. Winnowing tests: Getting quality coverage from a model checker without quantity. In 20$^{th}$ AIAA/IEEE Digital Avionics Conference, Daytona Beach, Fla., October 2001). An algorithm presented by Hong et al. reduces redundancy during generation. (See Hong et al., Data flow testing as model checking. In 25$^{th}$ International Conference on Software Engineering", pp 232-242, Portland, Oreg., May 2003. IEEE Computer Society). Applied to the stopwatch of FIG. 4, the Hong algorithm would record during generation of a test case to exercise the Lap_stop to Reset transition that it has also exercised the Running to Lap transition. The latter transition would be removed from its set of remaining coverage goals. However, the effectiveness of this strategy depends on the order in which the model checker tackles the coverage goals: if it generates the test for Running to Lap before the one for Lap-stop to Reset, then this winnowing will be ineffective.

The inventive method overcomes this inefficiency in test sets by extending existing test cases to reach uncovered goals, rather than start each one afresh. Extension of existing test cases to reach uncovered goals eliminates much redundancy from the test set and it reduces the total number of test cases required to achieve coverage. Although conceptually straightforward, it is not easy in practice to cause a model checker to find a counterexample that extends an existing one when the only way to interact with the model checker is through its normal interfaces (where all one can do is supply it with a system specification, an initial state, and a property). The preferred embodiment employs modern model checkers that provide scriptable interfaces, and the method uses the scriptable interfaces to effect rapid construction of suitably customized analysis tools.

As suggested by representation of the preferred embodiment in FIG. 3, the inventive method has been applied using the SAL 2 model checking environment. The SAL 2 model checking environment provides state-of-the-art symbolic, bounded, infinite-bounded, and witness model checkers. It also provides an API that gives access to the basic machinery of these tools. The API is scriptable in Scheme and the model checkers are Scheme scripts. SAL 2 contains API functions that can perform or can easily be extended to perform a model check, either symbolic or bounded, on a given system and property, and to continue a model check given a previously reached state and a path to get there.

The inventive method exploits these API functions to construct a script that extends each test case to discharge as many additional coverage goals as possible, and that starts a new test case only when necessary. A pseudo code rendition of this script is shown in FIG. 5. On completion, the variable failures contains the set of coverage goals for which the algorithm was unable to generate test cases.

Note that in the most deeply nested part of FIG. 5, the code to remove from remaining any goals discharged by extending a test case: this set contains only those goals that were not discharged by previous attempts to extend the current case. If the model checker is using limited resources (e.g., bounded model checking to depth k), a certain goal may be discharged by an extension that can be found by model checking from a given test case, but not from its prefixes.

The method as depicted in FIG. 5 selects a particular coverage goal and attempts to discharge the goal by generating a new test case or extending the current one. This means that the coverage goals are explored in some specific order that is independent of their "depth" or "difficulty." Furthermore, the method may place a particular goal in the failures set because it is unable to generate a test case to discharge it from the start state, whereas it might have been able to generate a test case had it tried to do so by extending some previously generated test case.

A further inventive aspect of the method is demonstrated in embodiments in which multiple coverage goals are considered in parallel. Rather than picking a coverage goal and asking the model checker to discharge it, the entire set of undischarged goals can be given to the model checker and the model checker can be asked to discharge any one of them. That is, instead of separately model checking the assertions "always not p," "always not q" etc., one model checks "always not (p or q or . . . )." This feature of the inventive method enables the model checker to first discharge shallow or easy goals and approach the deeper or more difficult goals incrementally. Moreover, as already discussed relative to FIG. 5, it may be possible to discharge a difficult goal by extending an already discovered test case when it could not be discharged (within some resource bound) from an initial state, or from a shorter test case generated earlier in the process.

As test generation proceeds, those parts of the system specification that have already been covered may become irrelevant to the coverage goals remaining. Modern model checkers, including SAL, generally perform some form of automated model reduction that is similar to (backward) program slicing. Typically, cone of influence reduction is used. Slicing or cone of influence reduction eliminates those state variables and those parts of the model which do not influence the values of the state variables appearing in the assertion to be model checked.

In the inventive method, the parts of the system specification that become irrelevant are sliced away at each step, causing the specification to shrink as the outstanding coverage goals become fewer and, presumably, harder to discharge (because the easy ones would be picked off earlier). Recall that a test case of length 6,000 is required to exercise the lower right transition in the flowchart 42 of FIG. 4. A model checker cannot quickly find the corresponding counterexample so long as its search is cluttered with the vast number of display and control states that are independent of the state variables representing the clock. Once the coverage goals in the statechart part of the model have been discharged, however, all those state variables can be sliced away, isolating the flowchart 42 and rendering generation of the required counterexample feasible. Pseudo code illustrating this aspect of the method appears in FIG. 6.

A further aspect of the inventive method is the means to generate new searches from previously discovered states rather than returning to the initial states. The method as depicted in FIG. 6 always seeks to extend the current test case, and if that fails it starts a new case. However, the test cases that have already been found provide the ability to reach many states, and the inventive method may seek an extension from some intermediate point of some previous test case, rather then start a completely new case when the current case cannot be extended. This is particularly so when at least one deep test case has already been discovered that gives entry to a new part of the statespace. There may be many coverage goals that can be discharged cheaply by constructing several extensions to that known, deep test case.

FIG. 7 presents pseudo code for a method that attempts (in the nested while loop) to extend the current test case as much as possible. If and when that fails, it tries (in the outer while loop) to extend a test from some state that it has reached previously (these are recorded in the variable knownstates). It is not necessary to call to the model checker iteratively to search from each of the knownstates: a symbolic or bounded model checker can search from all these states in parallel. This parallel search capability increases the efficiency of test generation.

The inventive method provides for finding extensions from states other than the initial state. The discussion below recounts the application of the method in embedded systems, using explicit state, symbolic and bounded model checkers, and various combined approaches.

All model checkers of interest in test generation take as their inputs the transition relation defining a state machine and its environment, the initial states, and an assertion. The assertion is usually expressed as a temporal logic formula. Because only formulas of the kind "always not p," are relevant to generation of test cases, the details of the temporal logic are not important. And although the model checker may actually work by encoding the assertion as a Büchi automaton, it does little harm in this case to think of the model checker as working by searching for a state that satisfies p and is reachable from the initial states.

The approach to model checking by explicit state exploration is very competitive for certain problems. As the name suggests, this kind of model checker uses an explicit representation for states and enumerates the set of reachable states by forward exploration until either it finds a violation of the assertion (in which case a trace back to the start state provides a counterexample), or it reaches a fixed point (i.e., has enumerated all the reachable states without discovering a violation, in which case the assertion is valid).

There are several strategies for exploring the reachable states: depth first search uses the least memory and often finds counterexamples quickly, but the counterexamples may not be minimal. On the other hand, breadth first search requires more memory and often takes longer, but will find the shortest counterexamples. It is known that counterexamples produced by an explicit-state model checker using depth-first search often are too long to be useful as test cases. Using a translation into SAL for the stop watch example of FIG. 4, SAL's explicit-state model checker operating in depth-first mode finds a test case for the transition at the bottom right in 25 seconds (on a 2 GHz Pentium with 1 GB of memory) after exploring 71,999 states, but the test case is 24,001 steps long. This is four times the minimal length because several START and LAP events are interspersed between each TIC. In breadth-first mode, on the other hand, the model checker does not terminate in reasonable time. However, if the model is sliced (thereby eliminating START and LAP events), both breadth- and depth first search generate the minimal test case of length 6,001 in little more than a second.

Explicit-state model checking needs to use breadth-first search to be useful for test case generation, and the search becomes infeasible when the number of states to be explored exceeds a few million. Subject to this constraint, it is capable of finding deep test cases.

Simple examples where the SUT is an embedded system taking several numerical inputs from its environment are often beyond the reach of explicit-state model checkers. Even in these simple cases, the reachable states rapidly exceed those that can be enumerated by an explicit-state model checker In one published example, an "altitude switch" takes numerical readings from three altimeters, one of which may be faulty, and produces a safe consensus value. If the altimeters produce readings in the range 0 . . . 40,000 feet, then an explicit-state model checker could blindly enumerate through a significant fraction of the $40,000^3$ (i.e., 64 trillion) combinations of input values before stumbling on those that trigger cases of interest. (See Heimdahl et al., Deviation analysis through model checking. In $17^{th}$ IEEE International Conference on Automated Software Engineering (ASE'02) pp 37-46, Edinburgh, Scotland, September 2002. IEEE Computer Society).

By contrast, this problem is handled by symbolic model checkers in fractions of a second. A symbolic model checker represents sets of states, and functions and relations on these, as reduced ordered binary decision diagrams (BDDs). This is a compact and canonical symbolic representation on which the image computations required for model checking can be performed very efficiently. The performance of symbolic model checkers is sensitive to the size and complexity of the transition relation, and to the size of the total statespace (i.e., the number of bits or BDD variables needed to represent a state), but it is less sensitive to the number of reachable states. The symbolic representation provides a very compact encoding for large sets of states. Symbolic model checkers can use a variety of search strategies and the search strategies can dramatically impact the verifying of valid assertions. For example, backward search verifies inductive properties in a single step. In test generation, however, where deliberately invalid properties are handled, a symbolic model checker, whether going forward or backward, must perform at least as many image computations as there are steps in the shortest counterexample. The symbolic model checker of SAL 2 can find the counterexample of length 6,000 that exercises the lower right transition of the flowchart in FIG. 4 in 125 seconds (it takes another 50 seconds to actually build the counterexample) and visits 107,958,013 states. If the model is sliced (eliminating START and LAP events), then the number of visited states declines to 6,001 and the time decreases to 85 seconds (plus 50 to build the counterexample).

A symbolic model checker can be very effective for test case generation when there are large numbers of reachable states as well as for fairly deep cases. A symbolic model checker's performance declines when the number of BDD variables grows above a couple of hundred, and when the transition relation is large. These conditions increase the time taken to perform image computations, and thus curtail the depth of the test cases that can be found in reasonable time.

Because BDD operation performance is highly dependent on arranging the variables in a suitable manner, finding a good variable ordering in systems requiring many BDD variables can pose significant additional cost. The methods used in the inventive application employ scripts using the same BDD representation to generate many tests, thereby incurring the cost associated with variable ordering only once.

Bounded model checkers are specialized to generate counterexamples and can perform verification by k-induction. A bounded model checker is given a depth bound k and searches for a counterexample up to that depth (i.e., length) by casting it as a constraint satisfaction problem. For finite state systems, this can be represented as a prepositional satisfiability problem and given to a SAT solver. Modern SAT solvers can handle problems with many thousands of variables and constraints. Each increment of 1 in the depth of bounded model checking increases the number of variables in the SAT problem by the number of bits needed to represent the statespace and by the number of constraints needed to represent the transition relation. Empirically, the complexity of bounded model checking is strongly dependent on the depth, and the practical limit on k is around 30-50. At modest depths, however, bounded model checking is able to handle very large statespaces without incurring the cost of BDD variable ordering encountered in symbolic model checking systems. Bounded model checking must compute the k-fold composition of the transition relation. Bounded model checking does not necessarily generate the shortest counterexamples: it simply finds some counterexample no longer than k. Although more expensive, iterative invocation of bounded model checking for k=1, 2, . . . will ensure that the shortest counterexample is found.

The solution of constraint satisfaction problems in the combination of propositional calculus and the theories of the infinite data types concerned (e.g., real and integer linear arithmetic) enables the extension of bounded model checking to infinite state systems. SAL 2 has such an "infinite bounded" model checker. As the SAL 2 infinite bounded model checker is based on the ICS decision procedure (described in co-pending, commonly assigned U.S. patent application Ser. Nos. 10/447,759 and 10/431,780, the entire disclosures of which are incorporated herein by this reference), which has the best performance of its kind for many problems, more applications of the inventive method are envisaged as work continues.

The inventive approaches to iterated extension described in the previous section confirm the effectiveness of bounded model checking for test generation. Furthermore, the inventive method minimizes one of its main weakness: whereas bounded model checking to depth 5 will not discharge a coverage goal that requires a test case of length 20, and bounded model checking to depth 20 may be infeasible, iterated bounded model checking to depth 5 may find a path to one goal, then an extension to another, and another, and eventually to the goal at depth 20—because 4 or 5 checks to depth 5 are much easier than one to depth 20.

The approach expressed in the pseudo code of FIG. 6 has been applied using bounded model checking to the Stateflow model for a shift scheduler for a 4-speed automatic transmission. (See G. Hamon and J. Rushby. An Operational Semantics for Stateflow. In M. Wermelinger and T. Margaria-Steffen, eds., *Fundamental Approaches to Software Engineering: 7th International Conference (FASE)*, Lecture Notes in Computer Science, pp 229-243, Barcelona, Spain, 2004. Springer-Verlag). This shift scheduler model has 23 states and 25 transitions. Using a translator from Stateflow to SAL, a single test case was generated of length 86 that provides complete state and transition coverage.

However, bounded model checking to modest depths, even when iterated, may be unable to exhaust a loop counter, or to find entry to other deep parts of a statespace. An effective approach is to use symbolic model checking with some resource bound as the model checker at the top of the outer while loop in FIG. 6. This call is cheap when many easy goals remain (the cost of BDD ordering is amortized over all calls), and can be useful in finding a long path to a new part of the state space when all the easy goals have been discharged. Moreover, slicing can be very effective in this situation. This combined approach is able to find a single test case that achieves state and transition coverage in the example of FIG. 4.

Using symbolic model checking in the outer while loop in the method of FIG. 7 may prove to be more effective. As in FIG. 6, using a symbolic model checker in this situation preserves the possibility of finding long extensions, should these be necessary. Equally important, the representation of knownstates as a BDD for symbolic model checking is likely to be compact, whereas its representation as SAT constraints for a bounded model checker could be very large.

All the foregoing enhancements to test generation presented have used model checking as their sole means for constructing test cases. However, a natural generalization leads directly to an attractive integration between model checking and other methods seeded by random testing or other methods. In particular, the method of FIG. 7 uses the states in the set knownstates as starting points for extending known paths into test cases for new goals. As new test cases generate paths to previously unvisited states, the method adds these to knownstates, but it starts with this set empty. Alternatively, this set may be initialized with some sampling of states and the paths to reach them discovered by any means whatsoever, as portrayed in FIG. 8.

Figure 8:
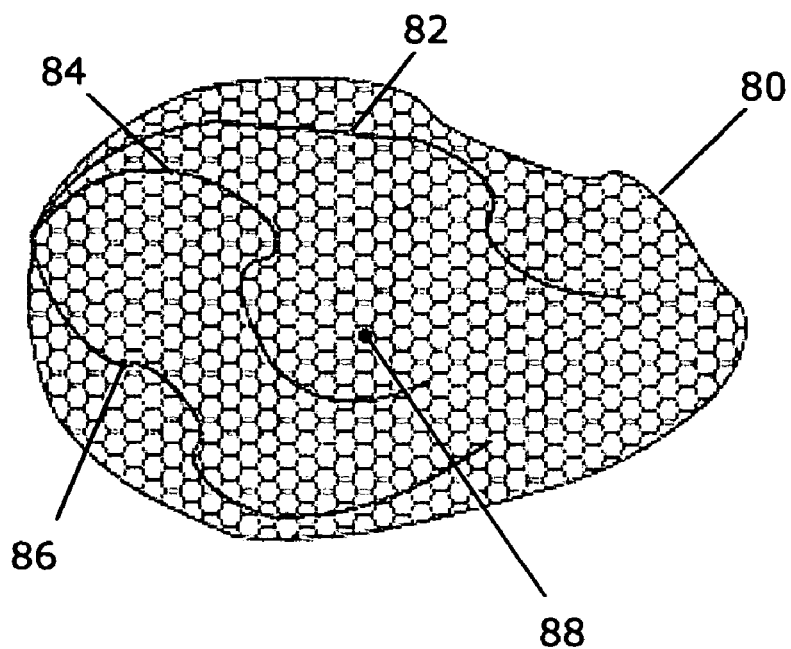
FIG. 8 depicts generalized seeding of knownstates by random testing.

In FIG. 8, the shaded FIG. 80 suggests the reachable statespace and the three interior lines 82, 84, 86 represent known paths through a sampling of states. Random testing is one way to create an initial population of states and paths. Concretized states and paths found by model checking abstractions of the original system may be another way. Explicit state model checking in heavily sliced models would be an instance of the latter. Referring again to FIG. 8, submitting a goal 88, to the method of FIG. 7 will start symbolic model checking from all the knownstates in parallel and is likely to find a short extension from one of them to the desired goal. If knownstates is considered too large to serve as the starting point for model checking, then some sample of the most likely candidates can be used instead. Of course, if there is more than a single outstanding goal, the symbolic model checker can search in parallel from all knownstates to all outstanding goals. Once an extension has been found, the bounded model checker will seek to further extend that path; and when that path is exhausted the search will revert to the symbolic model checker of the outer loop.

The inventive method provides efficient test sets generation for model-based embedded systems by using a model checker to extend tests discovered earlier in the process. Extending tests not only eliminates the redundancy of many tests with similar prefixes, but it allows the model checker incrementally to explore more deeply into the statespace. In this manner, more complete coverage is possible than could formerly be achieved under time and memory constraints.

The method taught herein requires "going under the hood" of the model checker to exploit the capabilities of modern, suitably scriptable APIs.

Figure 9:
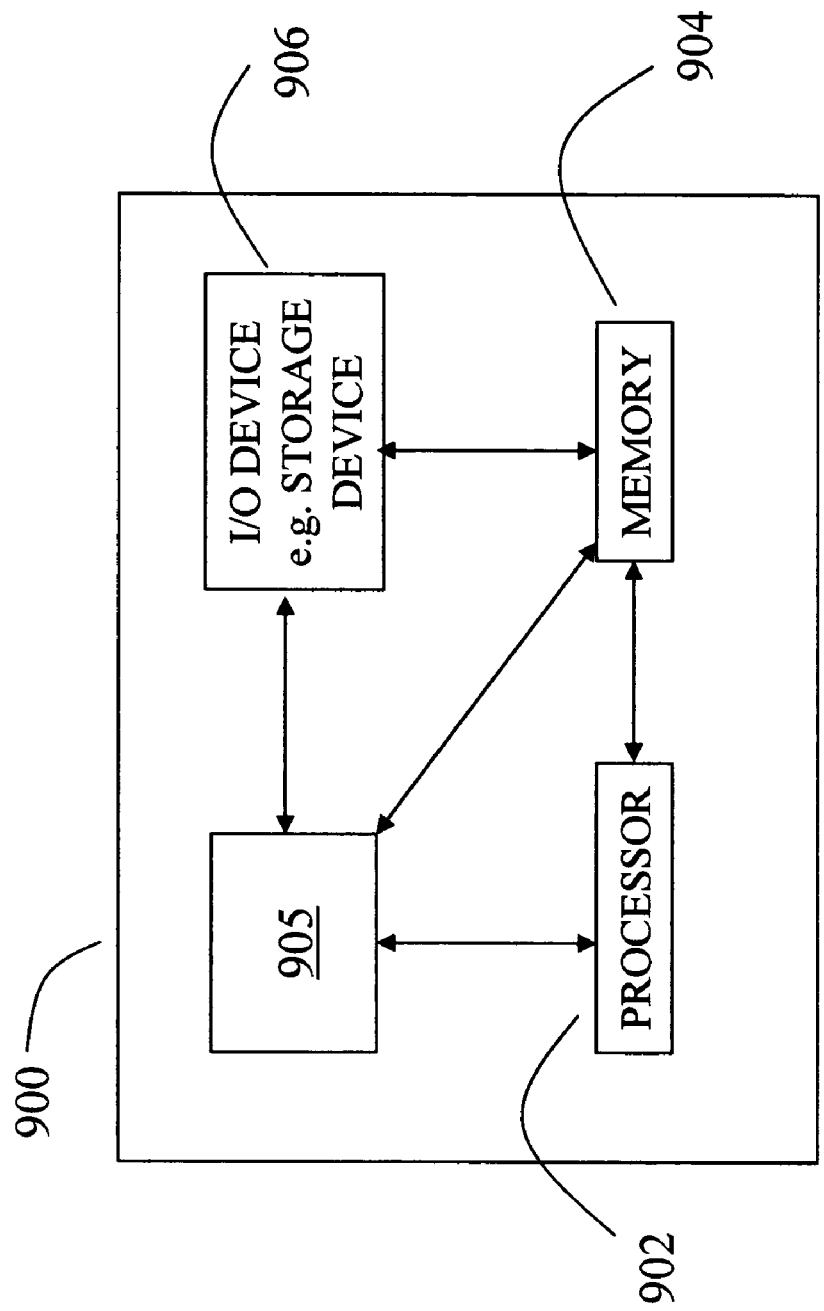
FIG. 9 is a high level block diagram of the present method for generating test cases.

FIG. 9 is a high level block diagram of the present method for generating test cases that is implemented using a general purpose computing device 900. In one embodiment, a general purpose computing device 900 comprises a processor 902, a memory 904, a test case generation module 905 and various input/output (I/O) devices 906 such as a display, a keyboard, a mouse, a modem, and the like. In one embodiment, at least one I/O device is a storage device (e.g., a disk drive, an optical disk drive, a floppy disk drive). It should be understood that the test case generation module 905 can be implemented as a physical device or subsystem that is coupled to a processor through a communication channel.

Alternatively, the test case generation module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the test case generation module 905 for generating test cases for a SUT, as described herein with reference to the preceding Figures can be stored on a computer readable medium or carrier (e.g., RAM, magnetic or optical drive or diskette, and the like).

The inventive method exploits the full power of model checking to search at each step for an extension from any known state to any uncovered goal, and uses slicing so that the complexity of the system being model checked is reduced as the outstanding coverage goals become harder to achieve. The method can be combined with others, such as random testing, that create a preliminary "map" of known paths into the statespace. Efficient methods for MC/DC coverage are possible with the method provided. More applications and approaches than are set forth here are apparent to those of skill in the relevant art. This invention is not intended to be limited to the examples set forth here but rather should be coextensive with the claims set forth and granted such scope as is afforded under all applicable laws.

We claim:

1. A method for test case generation to produce test cases from counterexamples produced by a formal analysis system relative to a model of a system under test comprising steps of:
   submitting the model and at least one predicate characterizing test targets to the formal analysis system with an assertion that none of the predicates is satisfiable;
   identifying one or more of the test targets that are satisfied by a first test case;
   eliminating one or more portions of the model that cannot contribute to a satisfaction of one or more of the test targets not satisfied by the first test case, wherein the eliminating results in a reduced model, and wherein the eliminating is performed each time at least one of the test targets is satisfied;
   obtaining a new counterexample from the formal analysis system in accordance with the reduced model, wherein the new counterexample is an extension to at least a part of a previously known counterexample from which the first test case is extracted, wherein the formal analysis system uses a processor to adapt a non-initial state of the previously known counterexample as an initial state from which to calculate the new counterexample;
   extracting a new test case from the new counterexample to cause the one or more of the test targets that cannot be satisfied by the first test case to be reached by the system under test; and
   forming a set of test cases, wherein the set of test cases includes the first test case and the new test case.

2. The method as in claim 1 wherein the new counterexample from the formal analysis system is an extension to a complete previously known counterexample.

3. The method as in claim 1 wherein the step of obtaining a new counterexample involves an analysis that considers in parallel more than one previously discovered counterexample.

4. The method as in claim 3 wherein the step of obtaining a new counterexample involves an analysis that considers in parallel all previously discovered counterexamples.

5. The method as in claim 1 wherein the step of obtaining a new counterexample involves an analysis that considers states visited in random testing as previously known counterexamples.

6. The method as in claim 1 wherein predicates characterizing all test targets are submitted to the formal analysis system.

7. The method as in claim 1 wherein the set of test cases generated satisfies a coverage metric relative to the system under test.

8. The method as in claim 7 wherein the coverage metric is MC/DC.

9. The method as in claim 1 wherein the formal analysis system is a model checker.

10. The method as in claim 1 wherein the model comprises a Stateflow statechart.

11. The method as in claim 1 wherein the step of submitting the model to the formal analysis system includes reducing the model.

12. The method as in claim 11 wherein said reducing the model comprises slicing.

13. The method as in claim 11 wherein said reducing the model comprises a cone of influence reduction.

14. The method as in claim 1 wherein the formal analysis system reduces the model prior to generating a counterexample.

15. The method as in claim 14 wherein said reducing the model comprises slicing.

16. The method as in claim 14 wherein said reducing the model comprises a cone of influence reduction.

17. The method as in claim 1 further comprising processing the set of test cases generated to remove redundancies.

18. The method of claim 1, wherein the initial state from which the new counterexample is calculated is different from an initial state from which the previously known counterexample is calculated.

19. The method of claim 1, wherein the non-initial state of the previously known counterexample is obtained by:
   storing one or more states of the system under test, wherein the one or more states are visited by a path generated by the previously known counterexample, and wherein the one or more states were previously unvisited by paths generated by other counterexamples; and
   selecting one of the one or more states as the non-initial state of the previously known counterexample.

20. A computer readable storage medium containing an executable program for test case generation to produce test cases from counterexamples produced by a formal analysis system relative to a model of a system under test, where the program performs steps of:

submitting the model and at least one predicate characterizing test targets to the formal analysis system with an assertion that none of the predicates is satisfiable;

identifying one or more of the test targets that are satisfied by a first test case;

eliminating one or more portions of the model that cannot contribute to a satisfaction of one or more of the test targets not satisfied by the first test case, wherein the eliminating results in a reduced model, and wherein the eliminating is performed each time at least one of the test targets is satisfied;

obtaining a new counterexample from the formal analysis system in accordance with the reduced model, wherein the new counterexample is an extension to at least a part of a previously known counterexample from which the first test case is extracted, wherein the formal analysis system uses a processor to adapt a non-initial state of the previously known counterexample as an initial state from which to calculate the new counterexample;

extracting a new test case from the new counterexample to cause the one or more of the test targets that cannot be satisfied by the first test case to be reached by the system under test; and forming a set of test cases, wherein the set of test cases includes the first test case and the new test case.

21. The computer readable storage medium of claim 20 wherein the new counterexample from the formal analysis system is an extension to a complete previously known counterexample.

22. The computer readable storage medium of claim 20 wherein the step of obtaining a new counterexample involves an analysis that considers in parallel more than one previously discovered counterexample.

23. The computer readable storage medium of claim 22 wherein the step of obtaining a new counterexample involves an analysis that considers in parallel all previously discovered counterexamples.

24. The computer readable storage medium of claim 20 wherein the step of obtaining a new counterexample involves an analysis that considers states visited in random testing as previously known counterexamples.

25. The computer readable storage medium of claim 20 wherein predicates characterizing all test targets are submitted to the formal analysis system.

26. The computer readable storage medium of claim 20 wherein the set of test cases generated satisfies a coverage metric relative to the system under test.

27. The computer readable storage medium of claim 26 wherein the coverage metric is MC/DC.

28. The computer readable storage medium of claim 20 wherein the formal analysis system is a model checker.

29. The computer readable storage medium of claim 20 wherein the model comprises a Stateflow statechart.

30. The computer readable storage medium of claim 20 wherein the step of submitting the model to the formal analysis system includes reducing the model.

31. The computer readable storage medium of claim 30 wherein said reducing the model comprises slicing.

32. The computer readable storage medium of claim 30 wherein said reducing the model comprises cone of influence reduction.

33. The computer readable storage medium of claim 20 wherein the formal analysis system reduces the model prior to generating a counterexample.

34. The computer readable storage medium of claim 33 wherein said reducing the model comprises slicing.

35. The computer readable storage medium of claim 33 wherein said reducing the model comprises a cone of influence reduction.

36. The computer readable storage medium of claim 20 further comprising processing the set of test cases generated to remove redundancies.

37. The computer readable storage medium of claim 20, wherein the initial state from which the new counterexample is calculated is different from an initial state from which the previously known counterexample is calculated.

38. The computer readable storage medium of claim 20, wherein the non-initial state of the previously known counterexample is obtained by:

storing one or more states of the system under test, wherein the one or more states are visited by a path generated by the previously known counterexample, and wherein the one or more states were previously unvisited by paths generated by other counterexamples; and selecting one of the one or more states as the non-initial state of the previously known counterexample.

* * * * *